United States Patent [19]

Sakai et al.

[11] Patent Number: 4,845,612
[45] Date of Patent: Jul. 4, 1989

[54] APPARATUS FOR ACCESSING A MEMORY WHICH HAS DEDICATED AREAS FOR SEPARATELY STORING ADDRESSES AND CHARACTER STRING DATA

[75] Inventors: Yasuo Sakai; Nobuteru Asai, both of Hitachi, Japan

[73] Assignee: Hitachi, Ltd., Tokyo, Japan

[21] Appl. No.: 851,825

[22] Filed: Apr. 14, 1986

[30] Foreign Application Priority Data

Apr. 12, 1985 [JP] Japan ................................. 60-76495

[51] Int. Cl.⁴ ......................... G06F 3/02; G06F 15/38
[52] U.S. Cl. .................................................. 364/200
[58] Field of Search ... 400/110; 364/419, 200 MS File, 364/900 MS File

[56] References Cited

U.S. PATENT DOCUMENTS

| | | | |
|---|---|---|---|
| 3,675,215 | 7/1972 | Arnold | 364/200 |
| 4,408,199 | 10/1983 | White et al. | 400/110 |
| 4,408,275 | 10/1983 | Kubo et al. | 364/200 |
| 4,543,631 | 9/1985 | Kurosu et al. | 400/110 |
| 4,544,276 | 10/1985 | Horodeck | 400/110 |

OTHER PUBLICATIONS

"Microprocessors and Microcomputer Development Systems," by Rafiquzzaman, copyright 1984, pp. 166-181.
"Micro Computer Systems: The 808618088 Family", Architecture Programming and Design, 2nd Ed., copyright 1984 & 6, pp. 296-305.

Primary Examiner—Archie E. Williams, Jr.
Assistant Examiner—Emily Y. Chan
Attorney, Agent, or Firm—Antonelli, Terry & Wands

[57] ABSTRACT

A memory access apparatus in which a data memory has a plurality of data storing areas is accessed by a CPU in accordance with a sequential access method. A window latch and an adder are provided between the memory and CPU. Addresses stored in the window latch and addresses issued by the CPU are added together to create a memory access address. The window latch is so set that a data storing area within the data memory corresponding to an inputted spelling of a word is accessible by the CPU.

5 Claims, 7 Drawing Sheets

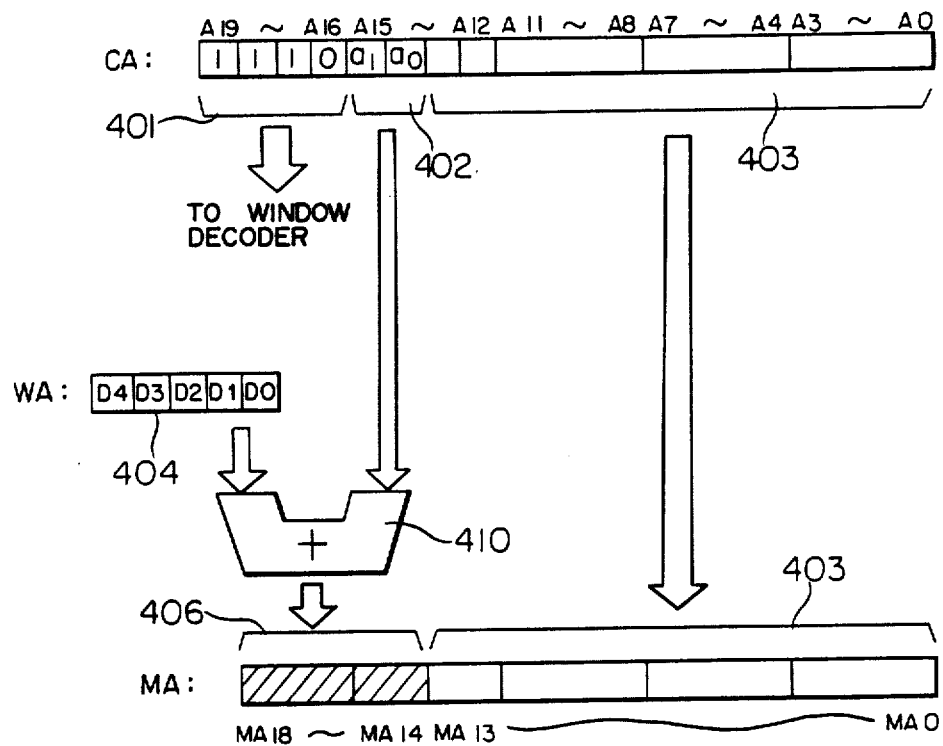

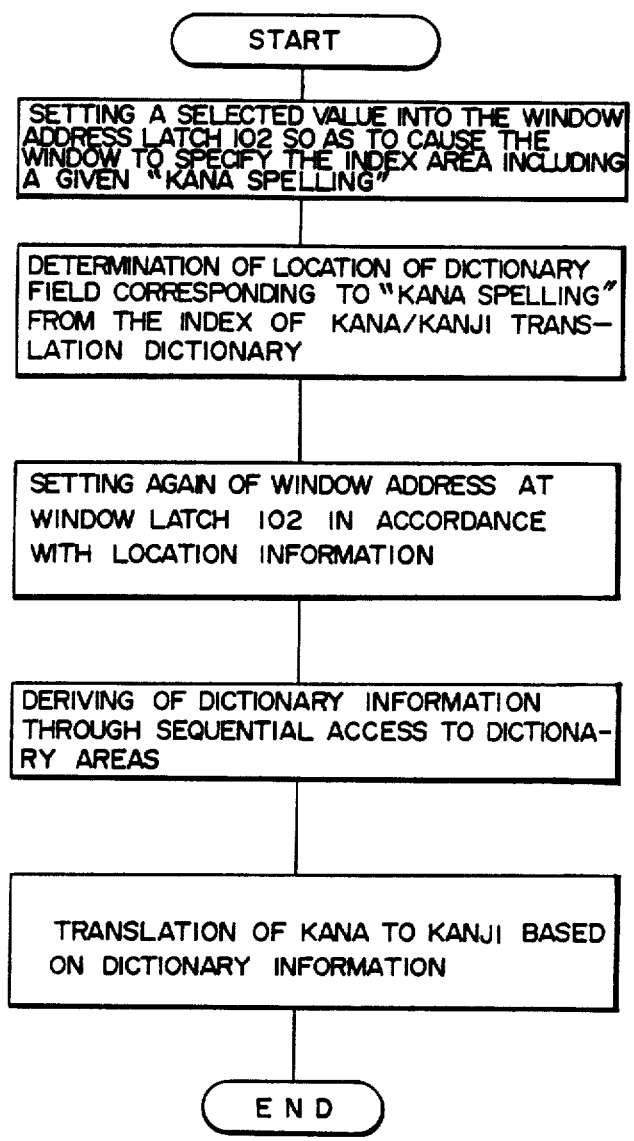

APPARATUS FOR ACCESSING A MEMORY WHICH HAS DEDICATED AREAS FOR SEPARATELY STORING ADDRESSES AND CHARACTER STRING DATA

BACKGROUND OF THE INVENTION

1. Field of the Invention

The present invention generally relates to a memory access apparatus for reading out from a data memory the data corresponding to an index character inputted through an input unit, and more particularly concerns a memory access apparatus capable of reading out the data from the data memory at an increased speed.

The memory access apparatus can be, for example advantageously applied to a kana (i.e. Japanese phonetic alphabet)/kanji (Chinese character) translation apparatus for translating a word represented by kana spelling into a kanji word in a Japanese character input/output apparatus.

2. Description of the Related Art

In general, the number of words collected in a dictionary for translation of Japanese phonetic characters (hereinafter referred to as kana) into Chinese characters (hereinafter referred to as kanji) in a Japanese character input/output apparatus is a range of 30,000 to 50,000 although it varies diversely in dependence on the sophistication level of the apparatus. When the kana/kanji translation dictionary containing such number of words is to be stored in a memory, the capacity of the latter will amount to 250K bytes to several M bytes. The CPU used commonly in the Japanese character input/output apparatus is of 16 bits and has a memory space of 1 M bytes to tens M bytes. Accordingly, the capacity of the above mentioned kana/kanji translation dictionary memory can not be ignored in implementing the memory for the CPU. Particularly, in the case of the Japanese character input/output apparatus incorporating a CPU whose address space is 1 M bytes, a major proportion of the address space is occupied by a program memory and a character generator (CG) for storing character patterns, resulting in that the address space available for the kana/kanji translation dictionary memory is much restricted. As a consequence, the capacity of the dictionary has to be reduced. In case the contents of the dictionary can not be compressed to such an extent that the dictionary can be accommodated within the address space available for the kana/kanji translation dictionary memory, the dictionary can not be contained in the address space of the CPU but it must be stored in an external storage equipment, which in turn gives rise to a problem that the kana/kanji translation processing can not be accomplished at a high speed as desired. In this conjunction, Japanese Unexamined Patent Application Publication No. 150070/1982 discloses an approach for compressing the capacity of the dictionary to solve one of the problems which the prior art Japanese character input/output apparatus suffer. However, no consideration is paid as to how to deal with such case where the dictionary can not be compressed down to the capacity of the address space of a CPU secured for the kana/kanji translation dictionary memory.

As an attempt to allow the CPU to make access to a memory of such capacity which can not be accommodated within the address space of the CPU, there has been known a technique generally referred to as a bank switching method. According to this method, the memory is divided into a plurality of areas, wherein the memory is so controlled that one of the areas can be accessed by the CPU. By adopting this bank switching method, it is certainly possible to implement the kana/kanji translation dictionary memory for the Japanese character input/output apparatus incorporating a CPU having an address space with little margin without being equiped with any external storage device even in case the capacity of the dictionary can not be compressed. However, this type of dictionary control apparatus still involves a problem in realizing a high-speed kana/kanji translation processing due to inherent features of the kana/kanji translation dictionary and the kana/kanji translation processing as mentioned below.

In general, with a view to attaining a high-speed kana/kanji translation processing, the kana/kanji translation dictionary is composed of an index and a dictionary including a plurality of dictionary fields. In the dictionary, the words arrays, each including "kana spelling", "Chinese character (kanji)" and "grammatical information" are arranged sequentially in an alphabetic order of Japanese kanas, i.e. "a", "i", "u", "e", "o" and so on, according to the leading kana of the kana spellings in the respective arrays. Each of the dictionary fields includes those word arrays whose kana spellings begin with the same kana. In the index, there are registered the locations, i.e. the relative addresses, of the first word arrays in the respective dictionary fields relative to the leading address of the dictionary memory. The capacities of individual dictionary fields differ from one another. Moreover, since the individual dictionary fields are allotted closely to one another in the dictionary in an effort to compress the capacity of the dictionary, the locations of the individual dictionary fields or areas lack uniformity or regularity. Such being the circumstances, when the kana/kanji translation dictionary is divided into areas each having a certain constant capacity, there occurs such a situation in which one dictionary field will cover a plurality of areas. In general, in the kana/kanji translation processing for a given "kana spelling", random access is made to the index with the aid of the leading kana of that "kana spelling", being then followed by the access to the dictionary fields on the basis of the registered location information of the leading kana of the "kana spelling" in the ascending order of powers (hereinafter referred to as the sequential access) to retrieve the "kanji (Chinese character)" and "grammatical information" corresponding to the "kana spelling". Consequently, a major portion of the CPU's access to the memory storing the dictionary data is necessarily occupied by the sequential access. It is now apparent that in case the bank switching method is adopted for making access to the kana/kanji translation dictionary memory, there frequently occur such a situation in which the dictionary field covers a plurality of banks, which means that the bank switching process is required in the course of the sequential access to that dictionary field, reducing thus the kana/kanji translation processing speed, to a serious problem.

In addition to the bank switching technique mentioned above, there is also known a segment method developed by INTEL Co. Ltd., of U.S.A. According to this method, the address of 16 bits generated internally of a CPU is extended to 20 bits for creating an external address for the CPU. More specifically, the address data of 16 bits generated internally of the CPU is stored in a register referred to as the segment register and multiplied with 16, the resulting product being then added with the 16-bit address data generated subsequently internally of the CPU to be utilized as the external address for the CPU. With this arrangement, an external address of 20 bits can be outputted by using a 16-bit data internally available by the CPU, whereby 1 M byte is effectively available for the address space. The CPU can make access to the memory address space of 64K bytes selectively without need for rewriting the segment register incorporated in the CPU, and the memory address space of 65K bytes can be used to specify any given region or area within the memory address of 1 M bytes by rewriting the segment register. It is however noted that the proposed segment method is directed to extend the address bus of the CPU and not intended for application to the kana/kanji translation dictionary memory for accomplishing the high-speed kana/kanji translation processing.

SUMMARY OF THE INVENTION

An object of the present invention is to allow access to a large capacity data memory at a high speed in a memory access apparatus having little or no margin in the address space.

In view of the above object, it is proposed according to an aspect of the invention that a temporary memory whose storage content can be altered by a CPU is disposed between the CPU and a data storing memory, and that an adder is provided which serves to add together the content stored in the temporary memory means and an address signal generated by the CPU, with the result of the addition being outputted from the adder as an address signal to be applied to the aforementioned memory. Further, the memory is divided into a plurality of areas which are selectively accessed through control means by the CPU. Upon data read-out processing, the content of the temporary memory means is so rewritten on the basis of index information that all the memory areas storing data to be read out are included in a field capable of being accessed by the CPU. Thereafter, the dictionary field in concern undergoes the so-called sequential access. In this way, need for changing the areas accessible by the CPU in the course of the sequential access of the relevant memory area can be eliminated, whereby the data read-out speed is significantly increased.

BRIEF DESCRIPTION OF THE DRAWINGS

FIG. 5 is a view for illustrating operation of an address adder employed in the memory address control circuit;

FIG. 6 is a view for illustrating correspondences existing among window addresses, CPU addresses and memory addresses;

FIG. 7 is a flow chart for illustrating kana/kanji translation processing;

DESCRIPTION OF THE PREFERRED EMBODIMENTS

In the following, an exemplary embodiment of the present invention will be described with reference to FIGS. 1 to 8.

Figure 1:
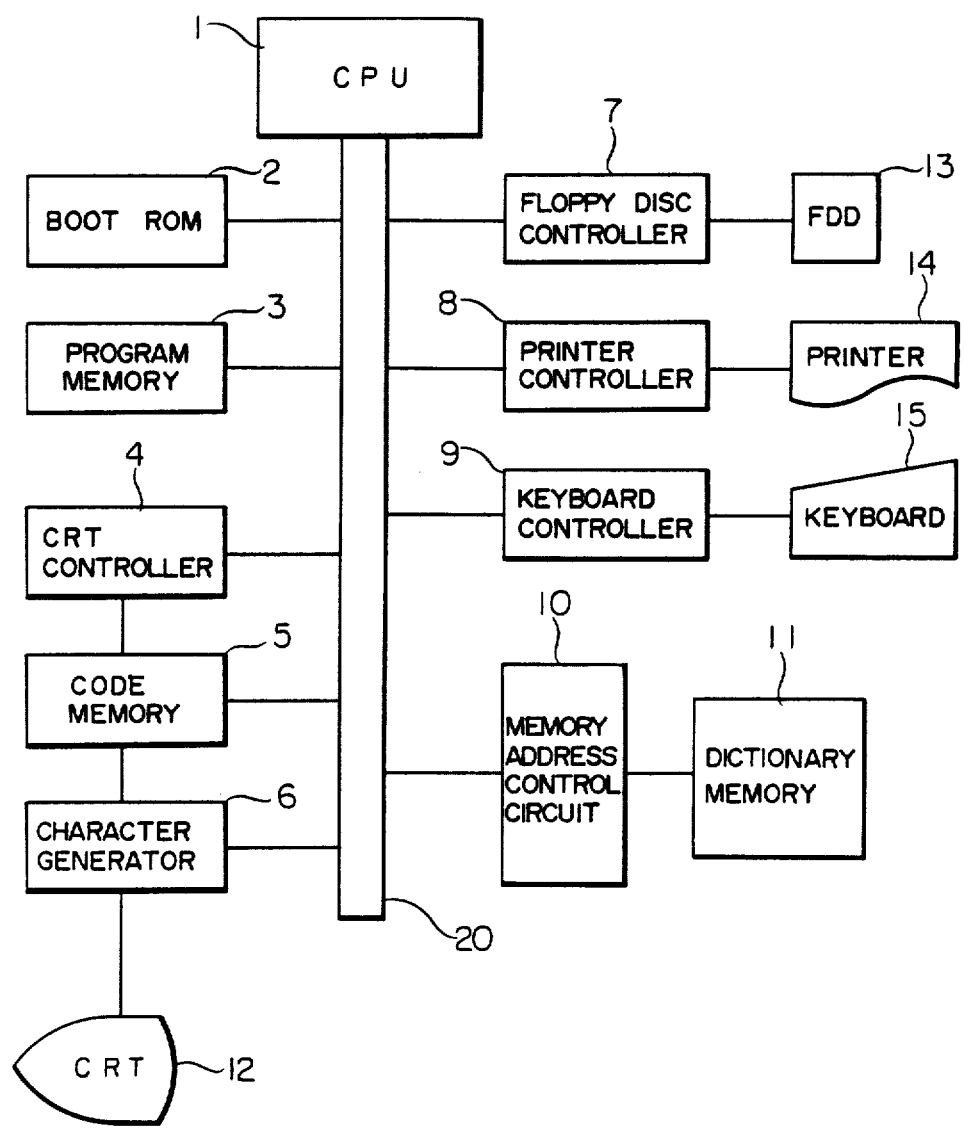
FIG. 1 is a block diagram showing a general arrangement of a Japanese character input/output apparatus according to an embodiment of the present invention.

FIG. 1 is a schematic block diagram showing a general arrangement of a Japanese character input/output apparatus to which an embodiment of the invention is applied.

Referring to FIG. 1, the Japanese character input/output apparatus includes a central processing unit or CPU 1 responsible for controlling the input/output apparatus, which is connected through a bus 20 to a bootstrap read-only memory or ROM 2 for storing a program which is to be executed upon power-on of the apparatus, a program memory 3 for storing programs, data or the like, a cathode ray tube display or CRT 12 for displaying character information and the like, a code memory 5 for storing character information and the like to be displayed on the CRT 12, a character generator 6 (hereinafter referred to as CG in abbreviation) for storing character patterns and the like to be displayed on the CRT 12, a CRT controller 4 for reading out the character patterns from the CG 6 in accordance with the character codes stored in the code memory 5 and transforming the patterns into picture signals which are then supplied to the CRT 12 together with a synchronizing signal to be displayed on the CRT 12 under the control of the CRT controller 4, a dictionary memory 11 storing a dictionary for the translation of kana (Japanese phonetic alphabet) into kanji (Chinese character) with a memory address control circuit 10 interposed between the bus 20 and the dictionary memory 11 for controlling the selective access of the CPU 1 to a part of the dictionary memory 11, a floppy disc drive unit (hereinafter simply referred to as FDD) 13 serving as an external storage for storing program and information with a floppy disc controller 7 interposed between the bus 20 and the FDD 13 for controlling the access of the CPU 1 to the FDD 13, a printer 14 for producing hard copies with a printer controller 8 interposed between the bus 20 and the printer 14 for controlling the printing-out of characters by the printer 14 under the command of the CPU 1, and a keyboard 15 serving as an input device with a keyboard controller 9 interposed between the bus 20 and the keyboard 15 for performing control upon recognition of information inputted through the keyboard by the CPU 1.

Figure 2:
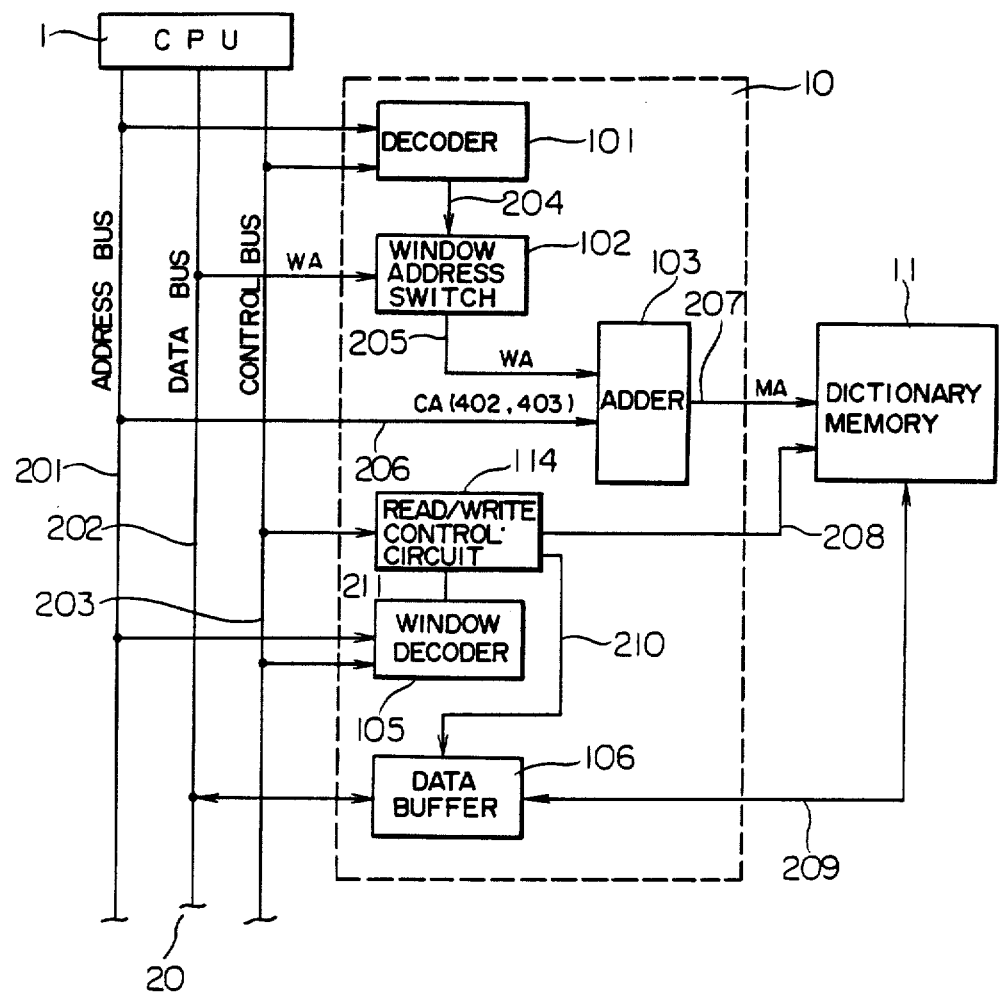
FIG. 2 is a block diagram showing a configuration of a memory address control circuit employed in the apparatus.

FIG. 2 is a schematic diagram showing a general arrangement of the memory address control circuit 10 which constitutes a major part in implementing the illustrative embodiment of the invention. The memory address control circuit 10 includes a decoder 101 which serves to detect an access of the CPU 1 to a window address latch 102 for writing a window address WA on the basis of information sent out from the CPU 1 through an address bus 201 and a control bus 203, thereby sending out a first CPU access signal to the window address latch 102 through a signal line 204. The window address latch 102 in turn responds to the first CPU access signal on the signal line 202 for storing temporarily the window address WA sent out on the data bus 202 by the CPU 1. The memory address control circuit 10 further includes a window decoder 105 which serves to detect the access of the CPU 1 to an address space corresponding to a dictionary window 50 within an address space illustrated in FIG. 4 on the basis of information sent on the address bus 201 and the control bus 203 by the CPU 1, to thereby send out a second CPU access signal to a read/write control circuit 104 along a signal line 211. The read/write control circuit 104 in turn responds to the second CPU access signal on the signal line 211 to detect that the CPU 1 is making access to the address space corresponding to the dictionary window and determines whether the CPU 1 is to perform the reading operation or writing operation on the basis of information on the control bus 203, wherein a first control signal is supplied to a data buffer 106 through a signal line 210 in accordance with the result of determination, while a second control signal is sent to the dictionary memory 11 through a signal line 208. The memory address control circuit 10 further includes an adder 103 which adds together the window address WA supplied from the window address latch 102 along the signal line 205 and a CPU address CA supplied through a signal line 206 connected to the address bus 201 of the CPU 1, to thereby send out a dictionary memory address MA to the dictionary memory 11 by way of a signal line 207. The aforementioned data buffer 106 is interposed between the data bus 202 of the CPU 1 and the dictionary memory 11 and serves for responding to the first control signal on the signal line 210 to thereby send data from the data bus 202 to the dictionary memory 11 through the signal line 209 or reversely send data from the dictionary memory 11 onto the data bus 202.

Figure 3:
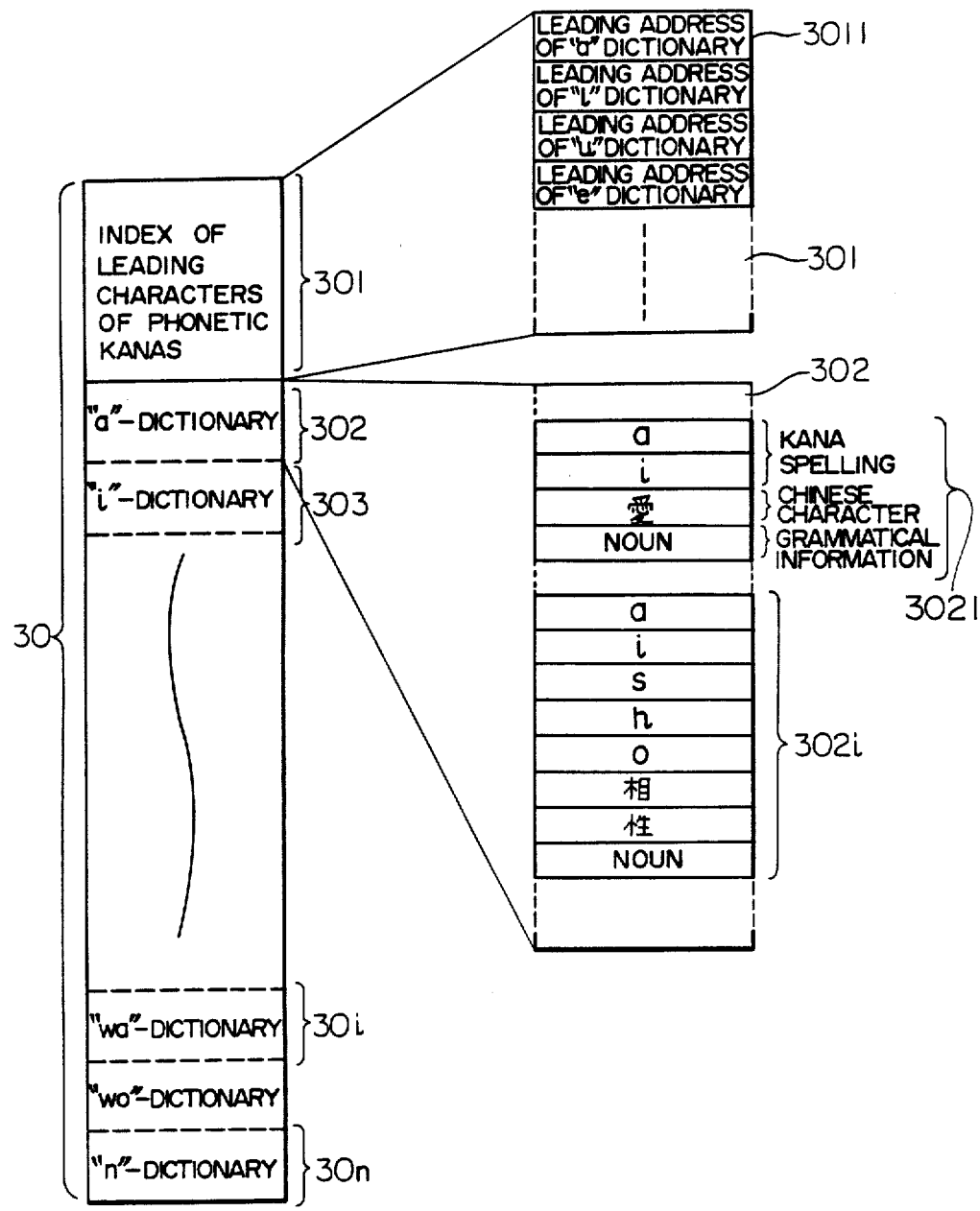
FIG. 3 is a view for illustrating composition of a kana/kanji translation dictionary.

FIG. 3 is a view for illustrating a composition of the dictionary 30 for kana/kanji translation, which dictionary is intended to be employed in the illustrative embodiment of the invention. More specifically, a whole structure of the dictionary is shown on the lefthand side, while a fragmentary enlarged view thereof is shown on the righthand side. As will be seen in FIG. 3, the dictionary 30 comprises an index 301 and a plurality of dictionary fields 302 to 30n. In the dictionary, word arrays 302l, . . . 302i, . . . , each including "kana spelling", "Chinese character" and "grammatical information", are stored sequentially in alphabetical order of Japanese kanas, such as "a", "i", "u", "e", "o" and so on, according to the leading kanas of the kana spellings thereof and each of the dictionary fields is composed of those word arrays whose kana spellings begin with the same kana. The index 301 stores leading addresses 3011, . . . of the respective dictionary fields relative to the leading address of the dictionally memory.

Figure 4:
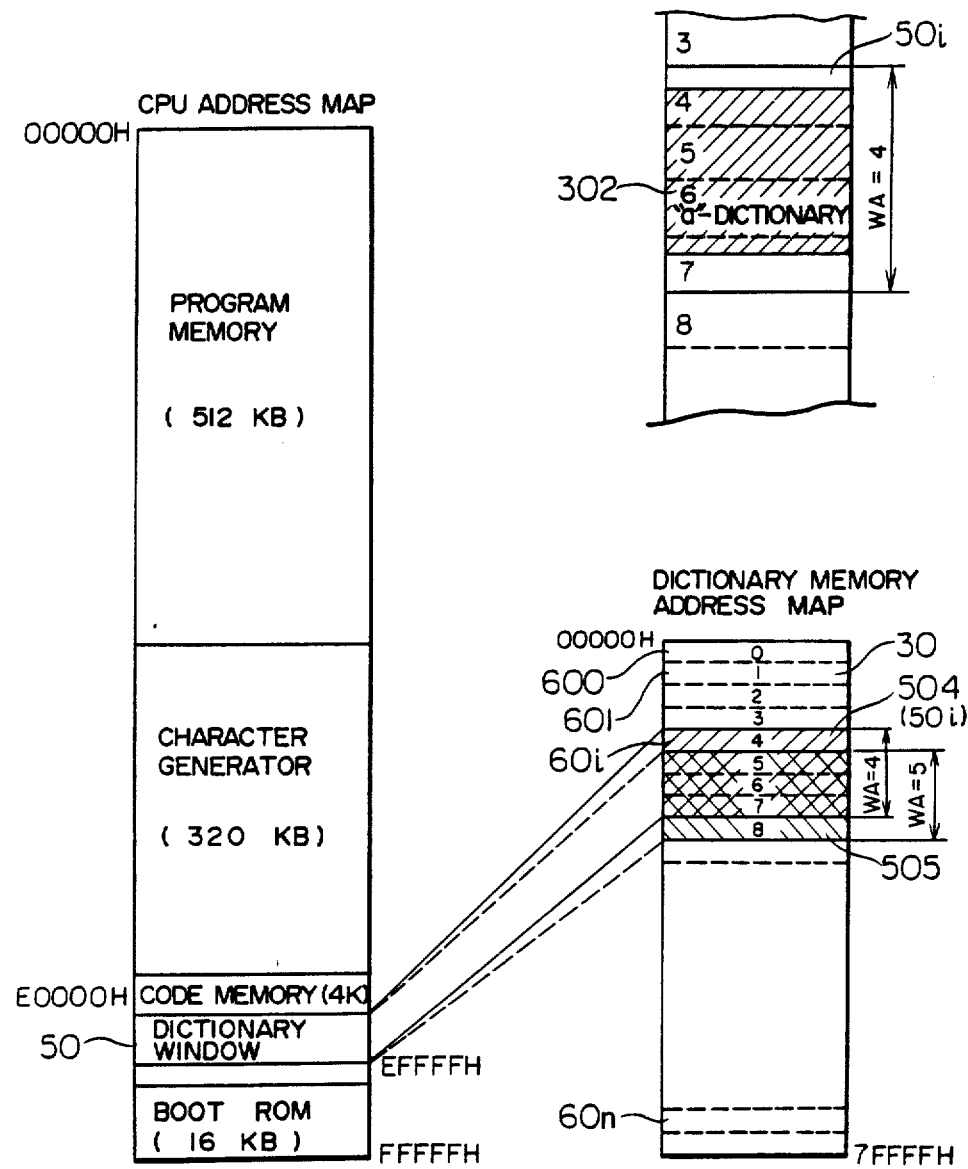
FIG. 4 is a view illustrating correspondence relationships between CPU addresses and dictionary memory addresses.
Figure 8:
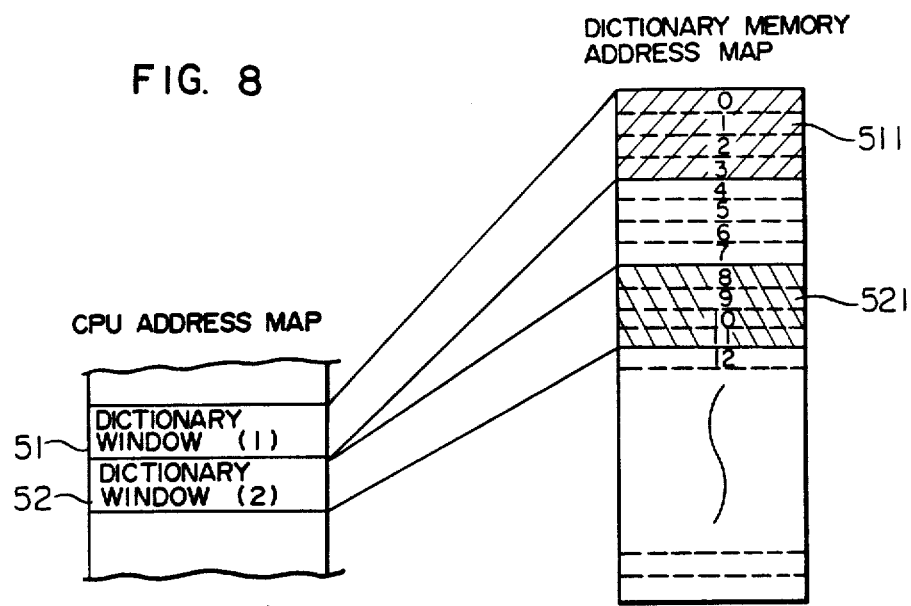
FIG. 8 is a view showing a version of correspondence relations between CPU addresses and memory addresses.

FIG. 4 is a view for illustrating correspondency between the address space of the CPU 1 and the memory space of the dictionary memory 11 storing the kana/kanji translation dictionary 30, which are associated with each other through the memory address control circuit 10 according to this embodiment of the invention. The dictionary window 50 which is a projection of a part of the dictionary memory 11 subjected to the access within the CPU address space upon access by the CPU 1 to said part of the dictionary memory is set at "EOOOOH" to "FFFFFH" of the CPU address space according to the hexadecimal notation in which "E" and "F" indicate "14" and "15" respectively and "H" is a symbol indicating that the numeral is indicated according to the hexadecimal notation. On the other hand, the dictionary memory 11 is divided into a plurality of areas 600 to 60n, of which selected continued areas 60i, 60i, . . . 60i are determined by a map 50i on the dictionary window 50 reflecting the real addresses of the areas in the dictionary memory 11 with application to the dictionary memory 11 a memory address MA which is the sum of the window address WA and the CPU address CA produced by the adder 103 of the memory address control circuit 10.

Now, description will be made on the operation of the adder 103 incorporated in the memory address control circuit 10. FIGS. 5 and 6 illustrate schematically the operation of the adder 103. The CPU address CA of 20 bits outputted from the CPU 1 includes a decode address 401 for decoding the dictionary window 50, an area decode address 402 for decoding areas within the projection 50i of the real addresses in the dictionary memory 11, and a memory address 403 representative of the memory address of the area 60n. The decode address 401 is used for detecting the access of the window decoder 105 to the dictionary window 50 of the CPU 1. The area decode address 402 is added with the window address WA 404 supplied from the window address latch 202 through the signal line 205 by an adder 410 constituting the adder 103, for thereby creating dictionary area decode address as shown at 406 for decoding the plurality of divided areas 60n of the dictionary memory 11. By combining together the area decode address 406 and the memory address 403, the memory address MA which is the real address of the dictionary memory 11 is created and subsequently applied to the dictionary memory 11.

FIG. 5 illustrates relations between the window addresses WA and the map addresses MA of the dictionary window 50 in the dictionary memory 11 indicated by the CPU address CA, as determined by the adder 103 performing the above operation. More specifically, the projection 50i of the dictionary window 50 on the dictionary memory 11 is composed of four successive or continuous areas 60i each having the capacity of 4000H, wherein the projection 50i is shifted within the address space of the dictionary memory 11 by 4000H whenever the value of the window address WA is incremented or decremented.

As will be seen in FIG. 4 at (b), the capacity of the dictionary window 50, i.e. the capacity of the projection 50i is selected to be larger than the sum of the maximum capacity of the dictionary area 30i of the kana/kanji translation dictionary stored in the dictionary memory 11 plus the capacity 4000H of each area 60i.

Upon power-on of the Japanese character input/output apparatus of the arrangement described above, the CPU 1 cause a program allowing the apparatus to operate as the Japanese character input apparatus to be transferred from the FDD 13 to the program memory 3 through the floppy disc controller 7 in accordance with the program stored in the ROM 2. After completion of the transfer, the input/output apparatus operates in accordance with the transferred program. When operator inputs a "kana spelling" with the aid of the keyboard 15, the "kana spelling" is received by the CPU 1 by way of the keyboard controller 9 to be stored in the program memory 3 as well as in the code memory 5. The CRT controller 4 periodically makes access to the code memory 5 for the purpose of displaying the character or the like on the CRT 12 by reading out the character patterns from the character generator 6 in accordance with the "kana spelling" written in the code memory 5. The character patterns thus read out are then transformed into corresponding picture signals to be supplied to the CRT 12 together with the synchronizing signal, whereby the inputted "kana spelling" is displayed on the CRT 12. Subsequently, when operator inputs an instruction commanding the kana/kanji translation processing of the inputted "kana spelling" through the keyboard 15 or when a "phonetic kana" inputted in succession to the above mentioned "kana spelling" represents, for example, a punctuation of a clause, the CPU 1 then starts the kana/kanji translation processing for the first mentioned "kana spelling". FIG. 7 shows this processing in a flow chart.

At first, the CPU 1 reads out the leading "phonetic kana" of the kana spelling stored in the program memory 3, and then writes "00H" in the window address latch 102 so that the index field 301 located at the leading portion of the dictionary memory 50 and storing the leading address information of the dictionary field 30*i* corresponding to said "leading phonetic kana" is included in the projection 50*i* of the dictionary window 50 or the dictionary memory 11. As a consequence, the memory address MA outputted from the adder 103 is changed over from "00000H" to "0FFFFH", whereby the window decoder produces a read/write control signal so that the CPU 1 can access the index field 301 through the dictionary window 50. Thus, the leading address information is read out from the index field 301 through the dictionary window 50, which information is representative of the relative address of the dictionary field 30*i* with reference to the leading or first one. Next, in order that the dictionary field is included in the first area 60*i* of the projection 50*i* of the dictionary window 50 in the dictionary memory 11, the less significant 14 bits is removed from the aforementioned leading address information, and the remaining bits are written in the window address latch 102. Now, the CPU 1 is capable of making access to the dictionary field 30*i* containing the inputted "kana spelling" by way of the dictionary window 50. Subsequently, in the CPU 1, the less significant 16 bits of the leading address information is combined with "111000 (2)" as the most significant bits, the resulting 20 bits being used as the leading address of the dictionary field 30*i* to make access to it sequentially to derive "kanji or Chinese character" and "grammatical information" corresponding to the inputted "kana spelling". On the basis of the information, the kana/kanji translation is performed.

Upon completion of the kana/kanji translation, the result thereof is stored in the program memory 3 and the code memory 5, respectively. As described previously, the CRT controller 4 periodically makes access to the code memory 5 for the purpose of displaying character on the CRT 12 in accordance with the information written in the code memory 5. In this manner, the result of the kana/kanji translation written in the code memory 5 is displayed on the CRT 12 to inform the operator of the result of the kana/kanji translation processing as executed.

As will now be appreciated from the foregoing, the kana/kanji translation apparatus applied to the Japanese character input/output apparatus according to the illustrated embodiment of the invention is capable of realizing the kana/kanji translation processing at a high speed even though a sufficient address space corresponding to the dictionary for kana/kanji translation is not available in the CPU 1 due to restriction imposed on the latter, because it is unnecessary to use an external storage equipment for storing the kana/kanji translation dictionary and also the processing of the sequential access to the dictionary field corresponding to the inputted "kana spelling" is not disturbed by any other processing.

Figure 9:
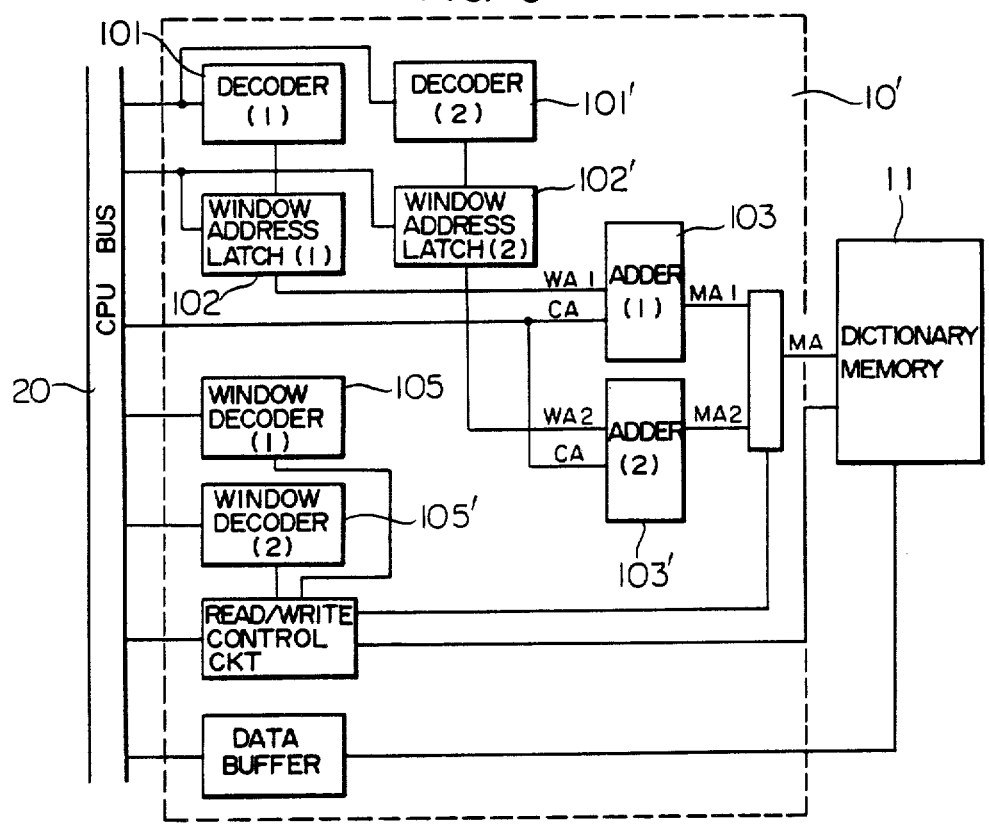
FIG. 9 is a view showing a modification of the memory address control circuit.

In the foregoing description, it has been assumed that the single dictionary window 50 is established for allowing access to a part of the kana/kanji translation dictionary memory 11. It should however be understood that two or more dictionary windows can be made use of. An exemplary arrangement to this end is illustrated in FIG. 9. Referring to the figure, the decoder 101, the window address latch 102, the window decoder 105 and the adder 103 of the memory address control circuit 10 are each provided in pairs, respectively. By supplying the dictionary memory addresses MA and MA' outputted from the address 103 and 103' selectively to the dictionary memory 11, the projections 511 and 512 of the real addresses on the dictionary memory 11 can be produced on the dictionary windows 51 and 52, which can be shifted on the dictionary memory independently of each other. Thus, the dictionary window 51, for example, may be used as the window for the retrieval of the index 301 for the leading kana of the kana/kanji translation dictionary, while the dictionary window 52 can be used as the window for retrieving the dictionary field 30*i* of the kana/kanji translation dictionary. By selecting the capacity of the dictionary window 51 larger than that of the leading phonetic kana, it is sufficient to make access once to the window address latch 102' upon kana/kanji translation processing illustrated in FIG. 7 for retrieving the phonetic dictionary field or area of the kana/kanji translation dictionary through the dictionary window 52. Thus, the number of times the access is to be made to the window address latches 102 and 102' can be decreased from twice to once, resulting in that the kana/kanji translation processing can be accomplished at a higher speed.

In the foregoing description of the embodiment, it has been assumed that the dictionary window 50 has a capacity of 64K bytes, the addresses are from E0000H to EFFFFH and that the projection of the dictionary window 50 on the dictionary memory 11 is constituted by four successive areas 60*i* each having the capacity of 4000H. However, these values are only for the purpose of illustration and can be readily altered by varying the decode value for detecting the access of the CPU 1 to the dictionary window 50, by changing the bit numbers of the decode address 401 of the CPU address CA, the area decode address 402 and the memory address 403, respectively, to thereby correspondingly changing the bit number of the window address WA 404.

Further, although it has been assumed that the kana/kanji translation memory 11 is constituted by a ROM, the former can be realized by using a RAM (random access memory). In this case, the CPU 1 reads the kana/kanji translation dictionary 30 from the FDD 13 through the floppy disc controller 7 upon power-on of the apparatus. Subsequently, the window address is written in the window address latch 102 with the address being varied, while the content of the kana/kanji dictionary 30 as read out is written in the kana/kanji translation memory 11. Succeeding operation can be performed in a manner similar to that of the preceding embodiment. When the kana/kanji translation dictionary memory 11 is constituted by a RAM, the contents of the dictionary in the kana/kanji translation dictionary memory 11 can be varied by altering the kana/kanji translation dictionary 30 in the FDD 13. Consequently, alternation or modification of the kana/kanji translation dictionary 30 can be accomplished in much facilitated manner as compared with the case where the dictionary memory 11 is constituted by the ROM.

The embodiment described above is directed to the memory access device for translating a Japanese phonetic character string into a character string containing chinese characters (i.e. kanjis). It is however obvious that the present invention can find a wide variety of applications where a data memory is accessed with the aid of a index character string to read out data contained in the memory.

We claim:

1. A memory access apparatus comprising:
   input means for inputting a character string of which a leading character is one of a plurality of predetermined characters;
   data memory means for storing data, said data memory means including a plurality of data storage areas, wherein each data storage area includes a plurality of locations for storing a set of data related to a character string commonly having a same leading character as one of said predetermined characters and an index area for storing respective leading addresses of said data storage areas;
   a CPU including a data memory access address space through which all locations of at least a selected one of said data storage areas are accessed sequentially, wherein said CPU responds to a character string inputted by said input means, reads out of said index area a leading address of one of said data storage areas corresponding to the leading character of the inputted character string and produces a CPU address; and
   control means connected to said CPU for receiving the leading address of one of said data storage areas and the CPU address from said CPU and having a temporary memory for storing said received leading address and an adder for adding data stored in said temporary memory to said received CPU address signal by which one of said data storage areas is selected to be accessed through said address space by said CPU.

2. A memory access apparatus according to claim 1, wherein said data storage areas are successive areas of said memory means.

3. A memory access apparatus comprising:
   input means for inputting a kana character string of which a leading kana character is one of a plurality of predetermined kana characters;
   kana/kanji translation dictionary memory means for storing translation data, said kana/kanji translation dictionary memory means including a plurality of data storage areas wherein each data storage data includes a plurality of locations for storing a set of kanji data represented by a kana character string commonly having a same leading kana character as one of said predetermined kana characters and an index area for storing respective leading addresses of said data storage areas;
   a CPU, including a memory access address space through which all locations of at least a selected one of said data storage areas are accessed sequentially, wherein said CPU responds to a kana character string inputted by said input means, reads out of said index area a leading address of one of said data storage areas corresponding to the leading kana character of the inputted kana character string and produces a CPU address; and
   control means connected to said CPU for receiving the leading address of one of said data storage areas and the CPU address from said CPU and having a temporary memory for storing said received leading address and an adder for adding data stored in said temporary memory to said received CPU address thereby producing a data memory access address signal by which one of said data storage areas is selected to be accesssed through said address space by said CPU.

4. A memory access apparatus according to claim 3, wherein said data storage areas are successive areas on said memory means.

5. A kana/kanji translation apparatus comprising:
   input means for inputting a kana character string of which a leading kana character is one of a plurality of predetermined kana characters;
   kana/kanji translation dictionary memory for storing translation data, said kana/kanji translation dictionary means including a plurality of data storage areas, wherein each data storage area is allotted to a group of kana character strings commonly having a same leading kana character as one of said predetermined kana characters and includes locations for storing a set of kanji data represented by said group of kana character strings and an index area storing respective leading addresses of said data storage areas;
   a CPU, including a memory access address space through which all locations of at least a selected one of said data storage areas are accessed sequentially, wherein said CPU responds to a kana character string inputted by said input means, reads out of said index area a leading address of one of said data storage areas allotted to the same leading kana character as that of the inputted kana character string and produces a CPU address; and
   control means connected to said CPU for receiving the leading address of one of said data storage areas and the CPU address from said CPU and having an adder for adding said received leading address to said received CPU address thereby producing a data memory access address signal by which one of said data storage areas is selected to be accessed through said address space from said CPU.

* * * * *